(No Model.)
C. P. L. NOXON.
ELECTRIC CURRENT INDICATOR.
No. 487,093. Patented Nov. 29, 1892.
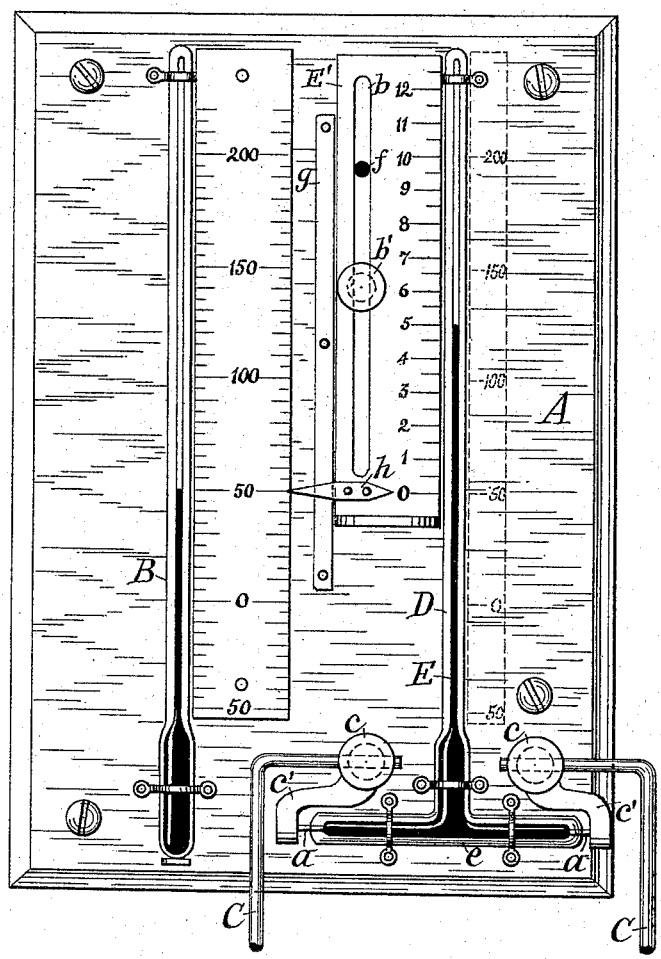
WITNESSES:
Mark W. Dewey
H. M. Seamans
INVENTOR
Charles P. L. Noxon
By Duck, Laass & Duell
his ATTORNEYS.

UNITED STATES PATENT OFFICE.

CHARLES P. L. NOXON, OF SYRACUSE, NEW YORK.

ELECTRIC-CURRENT INDICATOR.

SPECIFICATION forming part of Letters Patent No. 487,093, dated November 29, 1892.

Application filed November 24, 1891. Serial No. 412,994. (No model.)

*To all whom it may concern:*

Be it known that I, CHARLES P. L. NOXON, of Syracuse, in the county of Onondaga, in the State of New York, have invented new and useful Improvements in Electric-Current Indicators, of which the following, taken in connection with the accompanying drawing, is a full, clear, and exact description.

My invention relates to an indicator for indicating the strength of the current in an electric circuit or for indicating the difference of potential existing between two points in a circuit, the object of the invention being to provide convenient, effective, and reliable apparatus for determining the strength of an electric current, whether it be continuous, alternating, pulsating, or intermitting, and to accomplish this by employing the direct application or use of the current to be measured in actuating the indicating apparatus.

My invention consists in certain features of construction and combinations of parts, as will be hereinafter described, and pointed out in the claims.

The accompanying drawing is a front elevation of my preferred form of apparatus.

Referring specifically to the drawing, A is the base-board or support for the various parts of the apparatus, which may be secured to a wall, if desired, in any suitable manner.

B is an ordinary thermometer mounted upon the support A.

C C are terminals of an electric circuit, held by binding-screws, or terminals of the apparatus c c, also mounted upon the board A, and D is a transparent or glass receptacle containing the expansible fluid conducting substance E, as mercury. The receptacle D is similar to that of the ordinary thermometer B, and consists, preferably, of a tube or stem of very small diameter terminating at its lower end in a reservoir or bulb. The receptacle D differs from an ordinary thermometer in that its bulb has an inverted-T shape. By making the receptacle D of an inverted-T shape a twofold purpose is accomplished—viz., the contact ends of the wire, being sealed in the opposite ends of the lower member e of the receptacle, will always be immersed in the mercury no matter how low the temperature falls, and the terminals will also be removed farther apart than if immersed in the bulb of an ordinary thermometer, thus compelling the current to travel through a greater body of the conducting fluid. The bulb and a portion of the stem of the receptacle D is filled with mercury or other suitable expansible fluid conducting material. The bulb or reservoir is partly formed by a glass tube e, extending at right angles to the stem. Wires of platinum or other metal a a extend through the sealed ends of the tube e and connect the expansible fluid conducting substance E with metal pieces c' c', connected to the terminals c c. The thermometer B has preferably a double scale—that is, the metal strip arranged between the two stems and close to the stem of the thermometer has the ordinary thermometric scale on both sides of its face. Between this scale-strip and the stem of the receptacle D is an adjustable scale E', which consists of a metal strip somewhat shorter than the other strip, but of about the same width, arranged parallel to the thermometer-scale and in close proximity to the stem of the receptacle D. The said adjustable scale may be marked in any desired manner to show the strength of the current. Said adjustable scale is movable longitudinally and vertically by the side of a narrow metal strip g, forming a guide, secured to the board A between the two scale-strips. The lower end of the strip E' is bent up for the purpose of conveniently operating or raising and lowering the strip. The strip E' has a slot b extending nearly its entire length to permit the stem of a binding-screw b' to enter and remain in the board when the strip E' is operated and adjusted. The screw b' may be removed and placed in the hole f if it is necessary to raise the scale higher.

Opposite the zero (0) mark on the lower end of the adjustable scale is fixed a pointer or index h, which extends to the scale-strip of the thermometer, so that the zero-mark on the adjustable scale may be easily and accurately placed directly opposite any desired point on the thermometer-scale, this point being the level of the expansible substance of the thermometer B. Upon the passage of current through the mercury or other expansible substance in the tube e between the terminals c c the said substance will commence to heat, and the heat will increase as the current to be measured increases in quantity, the temperature of the substance varying with the varying quantity of the current passing through it. The expansible fluid will expand and rise in the stem of the receptacle in proportion to the extent to which the fluid is heated by the current, and the difference between the levels of the two columns of expansible fluids after the current has been flowing a few moments through the fluid in the tube $e$ will show the strength of the current.

In order to measure the current accurately, the scale E' is raised or lowered to bring the index or pointer thereon opposite or on a level with the mercury in the thermometer, which is shown in the drawing to be 50° above zero, and the strength of the current will be indicated by the level of the expansible fluid in the stem of the receptacle D and the marks and figures on the adjustable scale.

As it is evident that many changes in the construction and relative arrangement of parts might be resorted to without departing from the spirit and scope of my invention, I would have it understood that I do not restrict myself to the particular construction and arrangement of parts shown and described; but, Having fully described my invention, what I claim as new, and desire to secure by Letters Patent, is—

1. In a current-indicator, the combination, with an electric circuit, of a transparent receptacle of an inverted-T shape and a heat and electric conducting fluid in said receptacle, the terminals of the circuit entering the ends of the lower horizontal member of the receptacle at its opposite ends, substantially as described, and for the purpose specified.

2. In a circuit-indicator, the combination, with a thermometer and a fixed scale disposed beside the same, of an electric circuit, a transparent inverted-T-shaped receptacle, a heat and electric conducting fluid in said receptacle, the terminals of the circuit entering the ends of the lower horizontal members of the receptacle at its opposite ends, an adjustable scale in proximity to and parallel with said receptacle and with the fixed scale, and a pointer fixed to the adjustable scale at the zero-point and arranged to point to the degree-marks on the fixed scale, substantially as shown and described, and for the purpose specified.

In testimony whereof I have hereunto signed my name this 19th day of November, 1891.

CHARLES P. L. NOXON. [L. S.]

Witnesses:
MARK W. DEWEY,
J. J. LAASS.